United States Patent Office — 3,004,966 — Patented Oct. 17, 1961

3,004,966
6-METHYL STEROID COMPOUNDS AND METHOD FOR PREPARING SAME
Vladimir Petrow and David Morton Williamson, London, England, assignors to The British Drug Houses Limited, London, England, a British company
No Drawing. Filed Aug. 18, 1958, Ser. No. 755,368
Claims priority, application Great Britain Aug. 28, 1957
8 Claims. (Cl. 260—239.55)

This invention is for improvements in or relating to organic compounds and has particular reference to the preparation of the steroidal derivative 3β-hydroxy-6-methyl-25D-spirost-5-ene, and its conversion into 3β-hydroxy-6-methylpregna-5:16-dien-20-one and thence into 3β-hydroxy-6-methylpregn-5-en-20-one.

It is an object of the present invention to provide the three new steriodal compounds 3β-hydroxy-6-methyl-25D-spirost-5-ene (I) (R=H), 3β-hydroxy-6-methylpregna-5:16-dien-20-one (II) (R=H) and 3β-hydroxy-6-methyl-pregn-5-en-20-one (III) (R=H) and their corresponding 3β-acyloxy derivatives, having the general formulae below

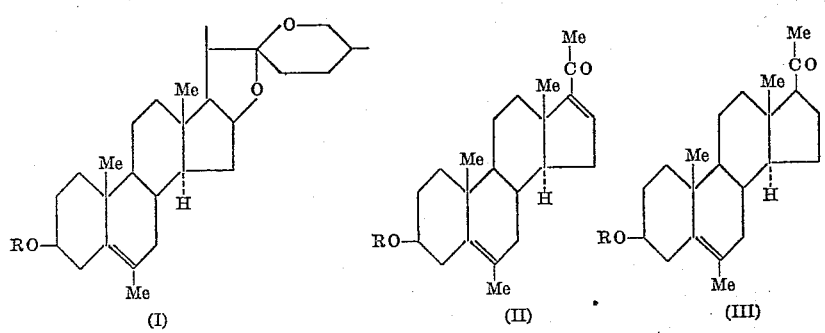

where R=hydrogen or an acyl group containing up to ten carbon atoms, which compounds are of value as intermediates in the preparation of compounds with useful biological properties and in particular for the preparation of the 6-methylated steroid hormones. Thus, 3β-hydroxy-6-methylpregna-5:16-dien-20-one (II; R=H) may be readily converted into, for example, 17α-acetoxy-6α-methylpregna -4-ene-3:20-dione, which is a potent progestational agent. It may also, for example, be converted into 3β-hydroxy-6-methylpregn-5-en-20-one (III) (R=H) which may be readily transformed into 6α-methylprogesterone, a methylated hormone with enhanced progestational activity.

Further, 3β-hydroxy-6-methylpregna-5:16-dien-20-one (II) (R=H) may be converted in relatively few stages into the valuable 6α-methyl ethisterone and 6α:21-dimethylethisterone which are known to be potent orally-acting progestational agents.

3β-hydroxy-6-methyl-25D-spirost-5-ene (I) (R=H) is the parent compound from which both pregnane derivatives (II) and (III) may be conveniently derived, and is therefore of value on this account.

It is a further object of this invention to provide a process for the preparation of the three compounds (I), (II) and (III) utilising a 3β-acyloxy-25D-spirost-5-ene having the general Formula IV (R=acyl) below as starting material.

According to the present invention there is provided a method for the preparation of 3β-hydroxy-6-methyl 25D-spirost-5-ene which method comprises converting 3β-acyloxy-25D-spirost-5-ene having the general Formula IV

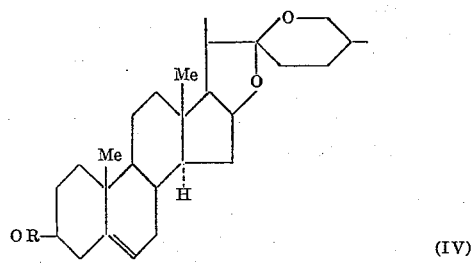

where R=acyl into a 3β-acyloxy-5α:25D-spirostan-6-one having the general Formula V

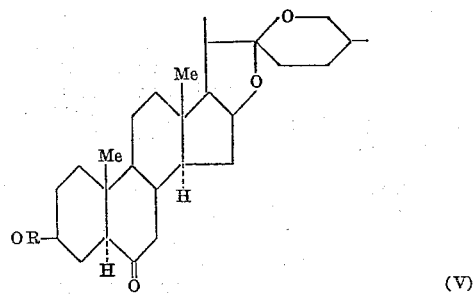

where R has the same meaning as above, reacting the 3β-acyloxy-5α:25D-spirostan-6-one with a methylmagnesium halide and reacylating to give a 3β-acyloxy-6α- methyl-5α:25D-spirostan-6β-ol having the general Formula VI

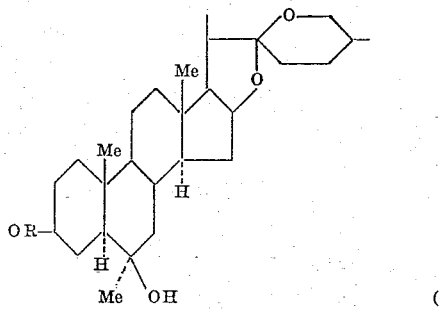

where R has the same meaning as above, dehydrating to obtain 3β-acyloxy-6-methyl-25D-spirost-5-ene and hydrolysing to obtain the 3β-hydroxy-6-methyl-25D-spirost-5-ene.

The 3β-acyloxy-6-methylpregna-5:16-dien-20-one (II) (R=acyl) may be obtained from 3β-acyloxy-6-methyl-25D-spirost-5-ene (I) (R=acyl) by degradation of the spiroketal side chain present in the 6-methyl spirostan derivative.

3β-hydroxy-6-methylpregn-5-en-20-one (III, R=H) may be obtained from 3β-acyloxy-6-methylpregna-5:16-dien-20-one (II, R=acyl) by partial hydrogenation and subsequent hydrolysis.

3β-acyloxy-25D-spirost-5-ene (IV) (R=acyl) may be converted into 3β-acyloxy-5α:25D-spirostan-6-one (V) (R=acyl) by methods known to those skilled in the art and in particular by the following two stage process.

The compound IV (R=acyl) may be reacted with a hypohalous acid, preferably hypobromous acid to give a 3β-acyloxy-5α-bromo-25D-spirostan-6β-ol having the general Formula VII

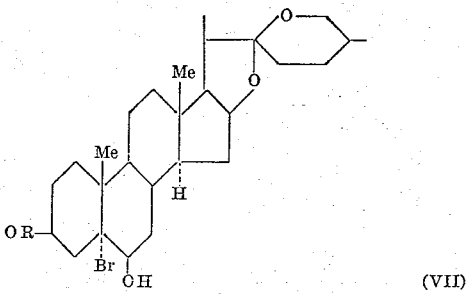

(where R=acyl) which is oxidised at $C_6$ and the bromine atom at position 5 replaced by hydrogen to give 3β-acyloxy-5α:25D-spirostan-6-one (V) (R=acyl).

Conversion of Compound IV (R=acyl) into the bromohydrin (VII; R=acyl) may be effected by treating compound IV (R=acyl) in an aqueous organic solvent which is stable to the reactants, such as, for example, aqueous dioxan, with N-bromo acetamide, followed by a strong acid such as perchloric acid. Oxidation of the product may be achieved in a manner well-known to those skilled in the art. Suitable oxidants include chromium trioxide in pyridine or in acetic acid, and N-bromoacetamide. Removal of the bromine atom to give the 3β-acyloxy-5α:25D-spirostan-6-one (V) (R=acyl) is conveniently effected by reduction with zinc dust in acetic acid.

Treatment of Compound V with methylmagnesium iodide or bromide in a solvent such as ethyl or butyl ether or benzene yields a product, which, after acylation, affords the 3β-acyloxy-6α-methyl-5α:25D-spirostan-6β-ol (VI) (R=acyl). Dehydration of the latter compound may be accomplished by means of thionyl chloride in a suitable base such as pyridine.

Degradation of the resulting product (I) (R=acyl) is effected by methods well known to those skilled in the art, whereby the product (II; R=acyl) is obtained.

Selective reduction of (II; R=acyl) with the formation of (III) (R=acyl) may be accomplished by a catalytic hydrogenation at 1 to 2 atmospheres pressure employing a suitable catalyst including a palladium on calcium carbonate catalyst. The hydrolysis of the acyl group to obtain the 3β-hydroxy compound (III; R=H) may conveniently be accomplished by heating with aqueous methanolic potassium carbonate.

Following is a description by way of example of a method of carrying the invention into effect.

*Example*

A solution of 3β-acetoxy-25D-spirost-5-ene (12.7 g.) in dioxan (220 ml.) was treated with N-bromoacetamide (5.6 g.) in water (20 ml.) and perchloric acid (1.5 ml.) in water (7 ml.). After 1 hour's stirring at room temperature, water was added and the product isolated with ether. The ethereal extracts were washed successively with aqueous solutions of potassium iodide, potassium thiosulphate, and sodium carbonate. After evaporation of the ether the residue crystallised from chloroform/hexane, giving 3β-acetoxy-5α-bromo-25D-spirostan-6β-ol, needles, M.P. 223 to 226° C., $[\alpha]_D^{21}$ −107° (c., 0.288 in chloroform).

The foregoing bromohydrin (5 g.) in dry pyridine (50 ml.) was left overnight at room temperature with pyridine/chromic acid (from chromium trioxide (5 g.) and pyridine (50 ml.)). The product was isolated with hot benzene and crystallised from methanol, to give 3β-acetoxy-5α-bromo-25D-spirostan-6-one, needles, M.P. 211 to 212° C., $[\alpha]_D^{22}$ −173° (c., 0.247 in chloroform).

The foregoing compound (3 g.) was debrominated by stirring and heating it on the steam-bath with zinc dust (3 g.) in acetic acid (30 ml.) for 45 minutes. After removal of the zinc the product was isolated with ether. 3β-acetoxy-5α:25D-spirostan-6-one formed prisms, M.P. 222 to 224° C., $[\alpha]_D^{22}$ −93° (c., 0.283 in chloroform).

The foregoing ketone (4.2 g.) in benzene (100 ml.) was added to a Grignard solution prepared from magnesium (2.4 g.) and methyl iodide (12.6 g.) in ether (50 ml.), and the mixture heated under reflux for 4 hours. After being kept overnight at room temperature, ammonium chloride solution was added, and the product isolated with benzene. Reacetylation with acetic anhydride/pyridine (50 ml. of each) gave 3β-acetoxy-6α-methyl-5α:25D-spirostan-6β-ol, needles, M.P. 238 to 241° C., $[\alpha]_D^{25}$ −85° (c., 0.354 in chloroform) after purification from acetone.

The foregoing Grignard product (0.5 g.) in dry pyridine (15 ml) was treated with thionyl chloride (5 ml.) at 0° C. After 10 minutes the mixture was treated with water, and the precipitated solids were collected, washed with water, and dried. Crystallisation from methanol gave 3β-acetoxy-6-methyl-25D-spirost-5-ene (I; R=acyl), needles, M.P. 218 to 220° C., $[\alpha]_D^{24}$ −129 (c., 0.356 in chloroform). Hydrolysis of this compound with hot aqueous methanolic potassium hydroxide gave 3β-hydroxy-6-methyl-25D-spirost-5-ene (I; R=H), which crystallised from methanol in needles, M.P. 181 to 182° C., $[\alpha]_D^{20}$ −126° (c., 0.62 in chloroform).

3β-acetoxy-6-methyl-25D-spirost-5-ene (6.98 g.) was heated under reflux for 2 hours with n-octanoic acid (9.24 ml.) and n-octanoic anhydride (4.8 ml.). After cooling, the mixture was diluted with ether, and the ethereal solution washed with water, 2 N-sodium hydroxide, and water, dried and evaporated. The residual gum was hydrolysed under reflux for 30 minutes with methanol (70 ml.) and potassium hydroxide (3.5 g.) in water (5 ml.). When hot water was added a solid was precipitated, which after cooling, was filtered off, washed with water, and dried. Crystallisation from methanol gave 6-methyl-25D-furosta-5:20-diene-3β:26-diol plates, M.P. 179° C., $[\alpha]_D^{25}$ −81° (c., 0.403 in chloroform).

The foregoing compound (5.2 g.) was acetylated on the steam-bath for 1 hour with acetic anhydride/pyridine (20 ml. of each). After addition of water the product was isolated with chloroform, which was removed leaving an oil. To this oil, dissolved in acetic acid (37 ml.), was added dropwise with cooling and stirring chromium trioxide (1.8 g.) in water (3.7 ml.) and acetic acid (37 ml.). The mixture was stirred for 1½ hours at room temperature, methanol was added, and the mixture poured into water. The product, isolated with chloroform, was an oil which was heated in acetic acid (40 ml.) for 2 hours. Most of the acetic acid was removed under reduced pressure and chloroform added to the residue. The chloroform solution was washed until neutral, dried, and evaporated to an oil, which was dissolved in benzene solution and trickled through a short column of alumina. Evaporation of the residue gave 3β - acetoxy - 6 - methylpregna - 5:16 - dien - 20 - one (II; R=acyl, plates, M.P. 121 to 123° C., $[\alpha]_D^{23}$ —60° (c., 0.505 in chloroform), $\lambda_{max.}^{EtOH}$ 240 m$\mu$ ($\epsilon$=9095)

after purification from aqueous methanol.

3β-acetoxy-6-methylpregna - 5:16 - dien - 20 - one (500 mgm.) was hydrolysed by heating under reflux with potassium hydroxide (500 mgm.) in acetone (20 ml.) and water (10 ml.) to give 3β-hydroxy-6-methylpregna-5:16-dien-20-one, (II, R=H) plates, M.P. 162 to 164° C., $[\alpha]_D^{25}$ —50° (c., 0.404 in chloroform, $\lambda_{max.}$ 238 m$\mu$, $\epsilon$=9050 in alcohol after crystallisation from aqueous acetone.

3β-acetoxy-6-methylpregna-5:16-dien-20-one (2.57 g.) was hydrogenated in 95% methanol (100 ml.) using 2% palladium/calcium carbonate (1.5 g.). Crystallisation of the product from aqueous methanol furnished 3β-acetoxy-6-methylpregn-5-en-20-one (III; R=Ac), needles, M.P. 150 to 151° C., $[\alpha]_D^{26}$ —3° (c., 0.557 in chloroform).

Hydrolysis of the preceding acetate (1.93 g.) with potassium carbonate (0.32 g.) in methanol (25 ml.) and water (2 ml.) for 1 hour on the steam-bath gave, 3β-hydroxy-6-methylpregn-5-en-20-one (III; R=H), prisms, M.P. 159 to 160° C., $[\alpha]_D^{26}$ +10° (c., 0.602 in chloroform) after crystallisation from aqueous methanol.

We claim.
1. A compound selected from the group consisting of 3β-hydroxy-6-methylpregn-5-en-20-one and its 3β-acyloxy derivatives wherein the acyl radical is derived from a hydrocarbon carboxylic acid containing up to 10 carbon atoms.
2. A method for the preparation of 3β-hydroxy-6-methyl-25D-spirost-5-ene which method comprises reacting a 3β-acyloxy-5α:25D-spirostan-6-one having the general Formula V

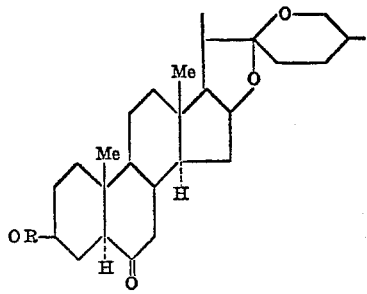

(V)

where R is an acyl radical derived from a hydrocarbon carboxylic acid containing up to 10 carbon atoms with a methylmagnesium halide and reacylating to give a 3β-acyloxy-6α-methyl-5α:25D-spirostan-6β-ol having the general Formula VI

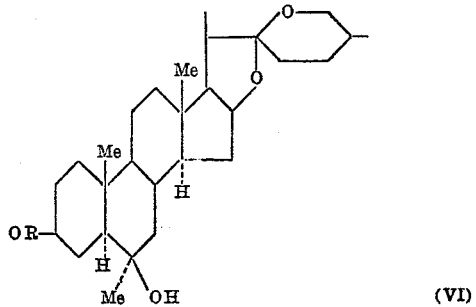

(VI)

where R has the same meaning as above, dehydrating with thionyl chloride in pyridine to obtain the corresponding 3β-acyloxy-6-methyl-25D-spirost-5-ene and hydrolysing to obtain the 3β-hydroxy-6-methyl-25D-spirost-5-ene.
3. A method as claimed in claim 2 wherein the 3β-acyloxy-5α:25D-spirostan-6-one is reacted with methylmagnesium iodide in a solvent.
4. A method for the preparation of 3β-hydroxy-6-methylpregn-5-en-20-one comprising subjecting 3β-acyloxy-6-methylpregna-5:16-dien-20-one wherein the acyl radical is derived from a hydrocarbon carboxylic acid containing up to 10 carbon atoms to partial hydrogenation and subsequent hydrolysis.
5. A method as claimed in claim 4 wherein said 3β-acyloxy-6-methylpregna-5:16-dien-20-one is subjected to catalytic hydrogenation at 1 to 2 atmosphere pressure employing palladium on calcium carbonate as catalyst.
6. A method as claimed in claim 4 wherein said hydrolysis is effected by heating with aqueous methanolic potassium carbonate.
7. 6-methyl-25D-furosta-5:20-diene-3β:26-diol.
8. A compound of the formula

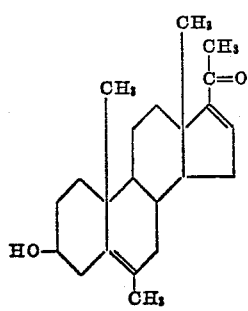

References Cited in the file of this patent

Natural Products Related to Phenanthracene, Fieser et al., 3rd edition, 1949, Reinhold Publishing Corp., New York 18, N.Y., pages 590–591.